UNITED STATES PATENT OFFICE.

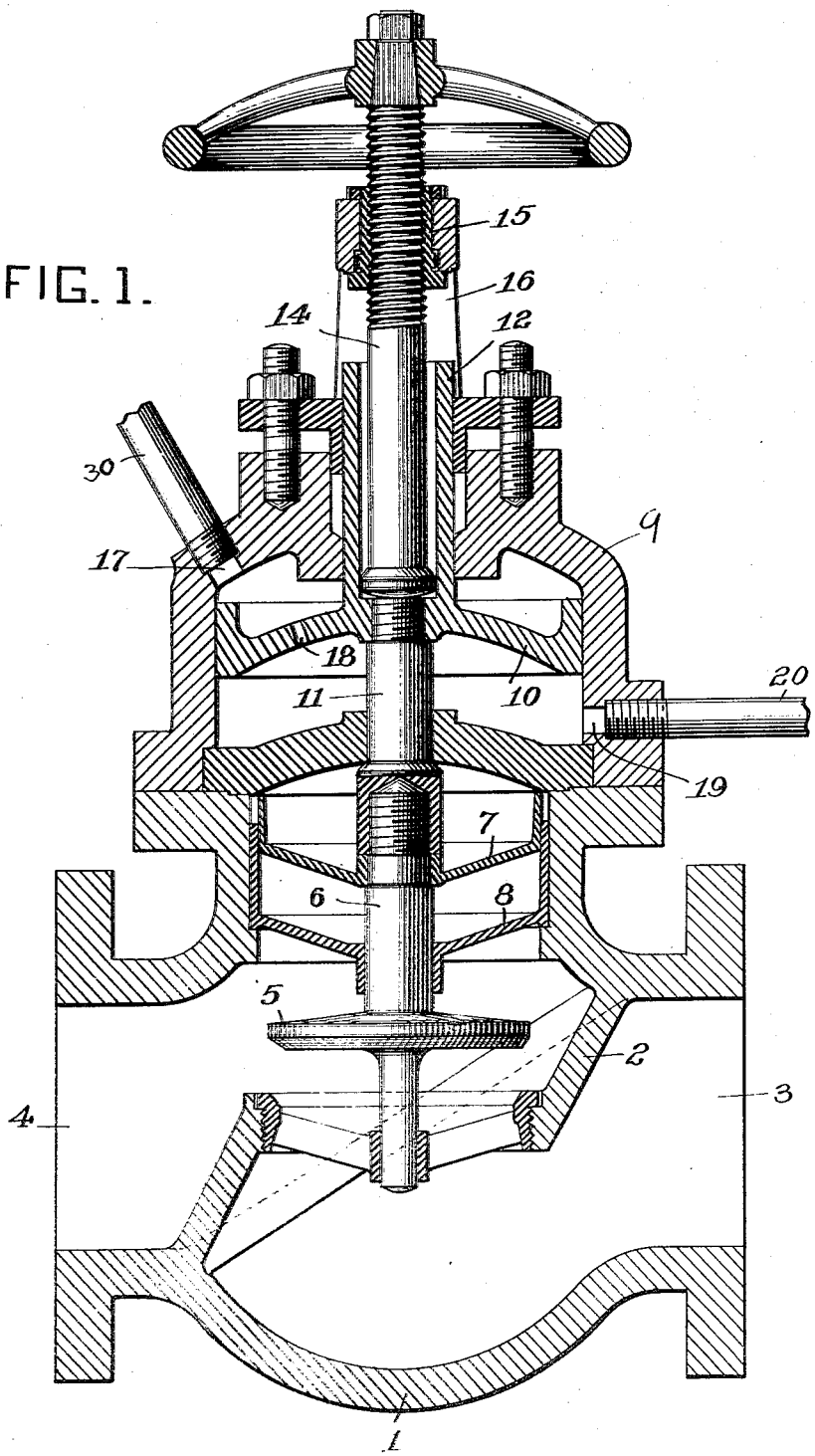

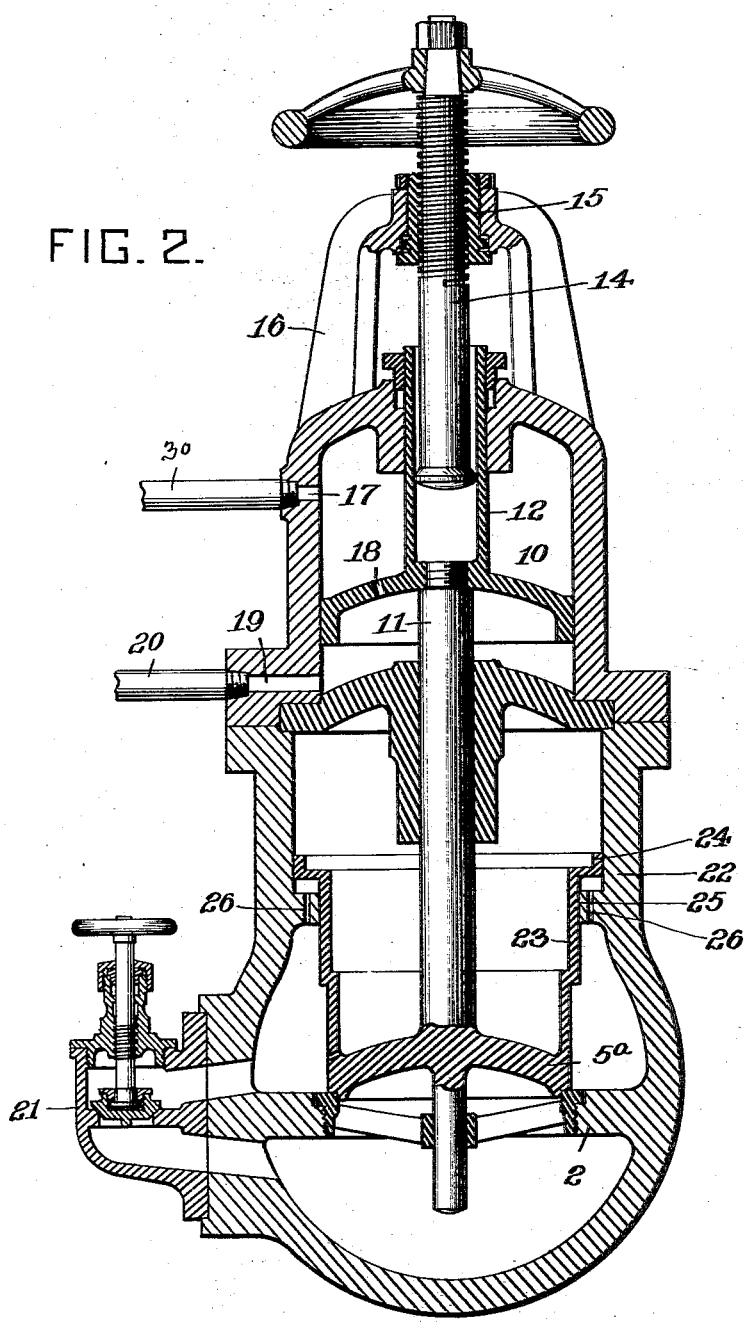

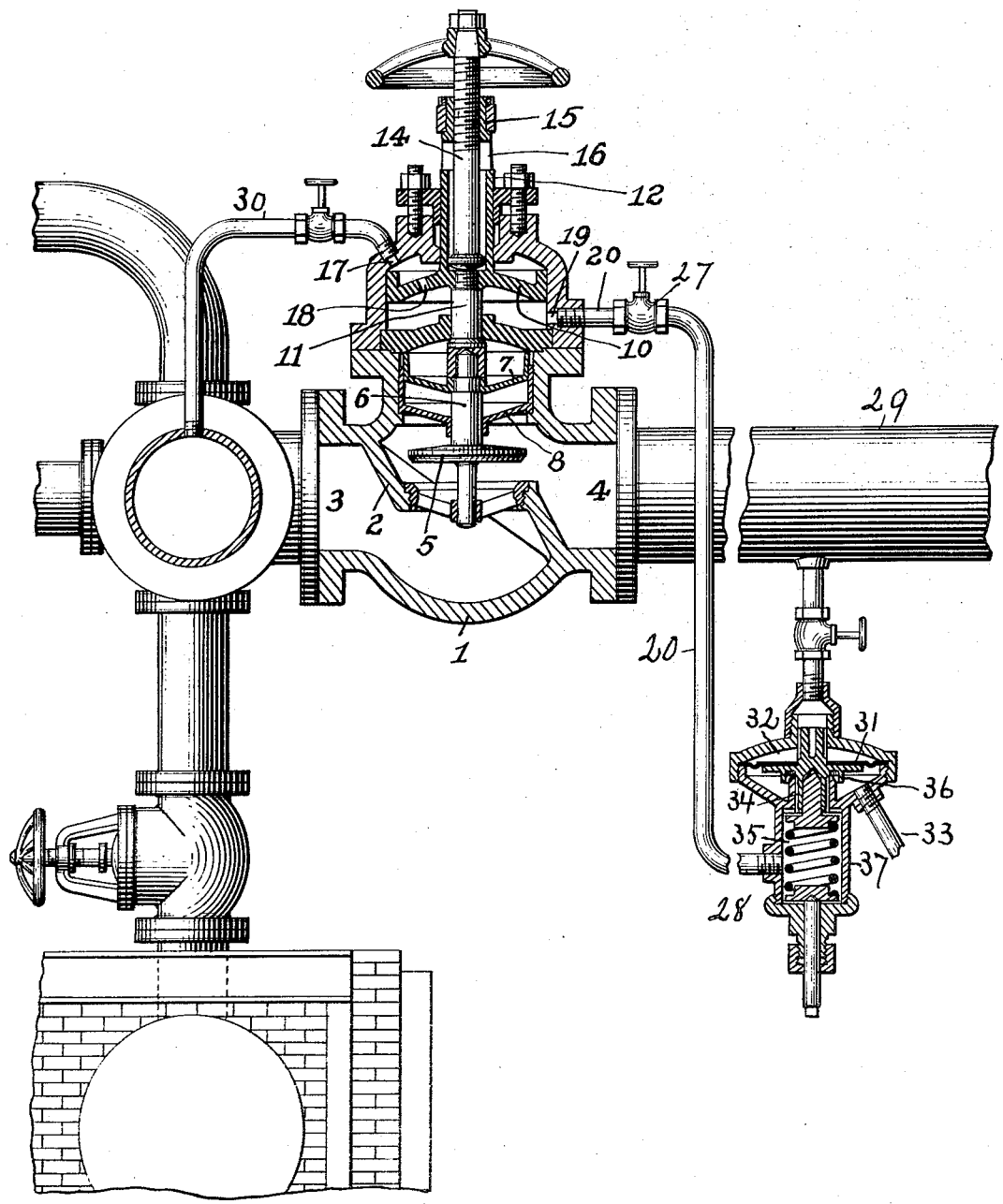

EDWARD V. ANDERSON, OF MONESSEN, PENNSYLVANIA, ASSIGNOR, BY DIRECT AND MESNE ASSIGNMENTS, TO GOLDEN-ANDERSON VALVE SPECIALTY COMPANY, OF PITTSBURG, PENNSYLVANIA, A CORPORATION OF PENNSYLVANIA.

NON-RETURN VALVE.

944,402. Specification of Letters Patent. Patented Dec. 28, 1909.

Application filed January 7, 1909. Serial No. 471,113.

*To all whom it may concern:*

Be it known that I, EDWARD V. ANDERSON, residing at Monessen, in the county of Westmoreland and State of Pennsylvania, a citizen of the United States, have invented or discovered certain new and useful Improvements in Non-Return Valves, of which improvements the following is a specification.

The invention described herein relates to certain improvements in valves, and is hereinafter more fully described and claimed.

In the accompanying drawings forming a part of this specification Figure 1 is a sectional elevation of my improved non-return valve, Fig. 2 is a similar view illustrating certain modifications, and Fig. 3 is a view partly in section showing the manner of connecting my improved valve mechanism to a boiler and the steam line therefrom.

In the practice of my invention the valve casing 1 is divided by a partition 2 into chambers 3 and 4, and through this diaphragm is formed a port adapted to be closed by a valve 5 which in the construction shown in Fig. 1 is provided with a stem 6 to which is connected a piston 7 operating in a cylinder 8, as shown and described in Letters Patent No. 811,813, granted to me February 6, 1906. As stated in said patent the head of the cylinder fits loosely around the stem 6 and the piston 7 fits in the cylinder so that steam may flow slowly into the cylinder above the piston and pressure on both sides of the piston be equalized.

To the valve casing 1 is secured a cylinder 9 in which is mounted a piston 10, having a stem 11 connected to the stem 6 of the valve as shown in Fig. 1. The piston is also provided with a tubular stem 12 extending up through a stuffing box on the cylinder 9. A threaded stem or rod 14 extends through a nut 15 carried by the yoke 16 connected to the valve casing, and extends down through the tubular stem 12 and bears against the piston. This stem 14 is provided with a hand wheel, whereby it may be rotated to shift the piston 10, and with it the valve 5 in order to seat the latter. The cylinder 9 is provided with an inlet port 17 connected by a pipe 30 with a source of fluid under pressure, as a boiler.

Suitable means are provided as a port 18 through the piston 10 whereby pressures on opposite sides of the piston may equalize. At or near its inner end the cylinder is provided with a port 19 which when the valve is to be used for effecting an emergency stop of the engine is connected to a pipe 20 extending through or to any suitable point in the plant. This pipe is provided with a hand operated valve 27 which when shifted will permit of the escape of fluid, thus lowering the pressure under piston 10, which will then be shifted closing the main valve.

When the valve is to be used as an automatic non-return valve as shown in Fig. 3, the port 19 is connected by the pipe 20 and a pilot valve 28, to the main steam line 29, at a point outside of the point where the main valve is connected to the boiler, as shown and described in Letters Patent No. 901,222, granted to me October 13, 1908. The pilot valve may be of the type shown in said patent or of any suitable construction. As described and shown in said patent the pilot valve, a diaphragm 31 extends across a chamber 32, the portion of the chamber above the diaphragm being connected to the steam line 29. The portion of the chamber 32 below the diaphragm is provided with an exhaust port 33 and is connected by a passage 34 to a second chamber 35, which is also connected by a pipe 20 to the outlet port 19 of the cylinder 9. The passage 34 is normally closed by a valve 36 held to its seat by steam pressure from the steam line 29. A spring 37 is arranged in the chamber 35 to exert an unseating pressure on the valve 36. The tension of the spring 37 is so adjusted that in case the pressure in the steam line 29 drops below that incident to the normal use of the steam, the valve 36 will be unseated allowing a free escape of steam from the underside of piston 10, so that pressure on the upper side of the piston will seat the valve 5.

When the valve is so connected that the steam enters through chamber 3, and pressure being equalized on both sides of piston 10, the pressure of the entering fluid will raise valve 5. When the valve is reversely connected so that fluid enters through chamber 4, pressure being equalized in cylinder 9, the pressure on valve 5 will hold it to its seat. To overcome this, a by-pass valve mechanism 21 is employed which being opened will permit of an equalization of pressures on both sides of valve 5, so that as the area on the upper side of the piston is reduced by the tubular stem 12 below that on the underside the valve will be shifted to and held in open position until pressure on the underside of the piston is reduced or the valve closed by the stem 14. While the use of the by-pass may be desirable for the reason that the parts 6, 7 and 8 are so connected that steam will flow more quickly into the cylinder 8 around the stem than into the portion of the cylinder above the piston and as the area of the underside of the piston is at least equal to that of the upper side of the valve, there will be an equalization of pressure of the lower and upper faces of the piston and valve for a sufficient time to permit of the valve being opened by the pressure on the underside of the pistons.

In lieu of cushioning the main valve by the parts or members 7 and 8 as shown in Fig. 1, the construction shown in Fig. 2 may be employed. As there shown the casing is formed with a cylindrical portion 22 for the reception of the upper portion of a piston valve 23 which is preferably made hollow and has its lower end closed to form the valve 5ª. A cushioning chamber is formed between a flange 24 on the upper end of the piston and an inwardly projecting flange 25 at or near the lower end of the cylindrical portion 22. Small ports 26 are provided for the escape of fluid from the cushioning chamber. It will be observed that the opening through the flange 25 is larger than the opening through the diaphragm 2, so that the lower end of the piston may be contracted. In the construction shown the area of the lower end of the piston subjected to opening pressure is less than the area subjected to pressure in the cylinder for seating the piston on the diaphragm, so that when there is a material difference of pressure, the piston valve will be seated. As the piston has comparatively narrow bearing surfaces on the valve, and such surfaces are closely adjacent when the piston is near the lower limit of its movement, it is preferred to employ additional guiding means consisting of a pin on the lower end of the piston movably mounted in a sleeve properly supported below the diaphragm.

I claim herein as my invention:

1. A non-return valve having in combination a casing having a passage therethrough, a valve controlling said passage a cylinder, a piston arranged in said cylinder for closing said valve, a normally open port for admitting fluid from a source of pressure to that side of the piston where it will operate to close the valve, means for permitting an equalization of pressure on both sides of the piston and a normally open port on the other side of the piston connected to a line of pipe extending from the source of pressure at a point outside of the valve mechanism.

2. A non-return valve mechanism having in combination a casing having a passage therethrough a valve controlling said passage, a cylinder, a piston connected to the valve, said cylinder being provided with a normally open port on one side of said piston adapted to be connected to a source of pressure and with a normally open port on theh opposite side of said piston adapted to be connected to a line of pipe extending from said source of pressure, and means for neutralizing the pressure to hold the valve in open position.

3. A non-return valve mechanism having in combination a casing having a passage therethrough, a valve controlling said passage, means operative by fluid pressure for closing said valve, means for applying fluid pressure for neutralizing such closing pressure, and means for reducing the efficiency of the neutralizing pressure.

4. A valve mechanism, a shell having a diaphragm provided with an opening connecting the chambers formed by the diaphragm, in combination with a cylinder portion having its outer end closed, an inwardly projecting flange partially closing the inner end of the cylinder, a cylindrical piston extending from the cylinder and adapted to seat around the opening in the diaphragm and provided at its upper end with a flange overlapping the flange at the lower end of the cylinder, and means permitting the flow of fluid from the outlet chamber of the valve casing to the space between the flanges on the cylinder and piston.

5. A valve mechanism, a shell having a diaphragm provided with an opening connecting the chambers formed by the diaphragm in combination with a cylinder portion having its axis in line with the axis of the opening through the diaphragm and having its upper end closed, an inwardly projecting flange partially closing the lower end of the cylinder, the opening formed by the flange being of a diameter greater than the diameter of the opening in the diaphragm, a cylindrical piston extending from the cylinder having its upper portion of an external diameter approximately equal that of the opening in the lower end of the cylinder, and its lower end contracted and adapted to close the opening through the diaphragm, a flange on the piston within the cylinder overlapping the flange on the cylinder, and means permitting the flow of fluid from the outlet chamber of the valve casing to the space between the flanges on the cylinder and piston.

6. A valve mechanism, a shell having a diaphragm provided with an opening connecting the chambers formed by the diaphragm in combination with a cylinder portion having its axis in line with the axis of the opening through the diapragm, and having its upper end closed, an inwardly projecting flange partially closing the lower end of the cylinder, the opening formed by the flange being of a diameter greater than the diameter of the opening in the diaphragm, a cylindrical piston extending from the cylinder having the upper portion of an external diameter approximately equal that of the opening in the lower end of the cylinder and its lower end contracted and adapted to close the opening through the diaphragm, a flange on the piston within the cylinder overlapping the flange on the cylinder, means permitting the flow of fluid from the outlet chamber of the valve casing to the space between the flanges on the cylinder and piston, and a connection from the inlet side of the valve casing to the cylinder at a point above the piston.

7. A valve mechanism, a shell having a diaphragm provided with an opening connecting the chambers formed by the diaphragm, in combination with a cylinder portion having its outer end closed, an inwardly projecting flange partially closing the inner end of the cylinder, a cylindrical piston extending from the cylinder and adapted to seat around the opening in the diaphragm and provided at its upper end with a flange overlapping the flange at the lower end of the cylinder, means at the lower end of the piston for guiding the same to its seat on the diaphragm and means permitting the flow of fluid from the outlet chamber of the valve casing to the space between the flanges on the cylinder and piston.

In testimony whereof, I have hereunto set my hand.

EDWARD V. ANDERSON.

Witnesses:
CHARLES BARNETT,
EDWARD F. MOSER.